UNITED STATES PATENT OFFICE.

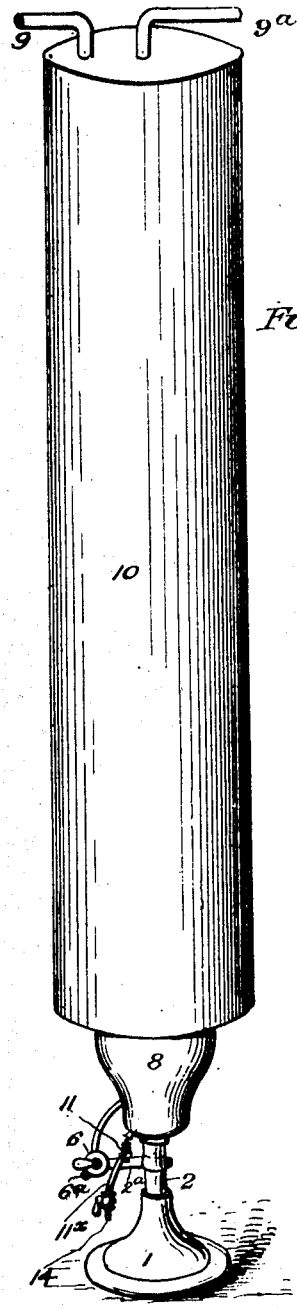
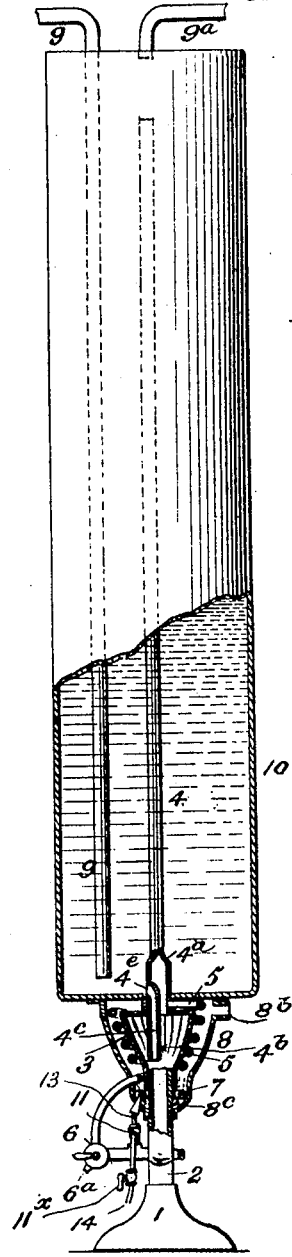

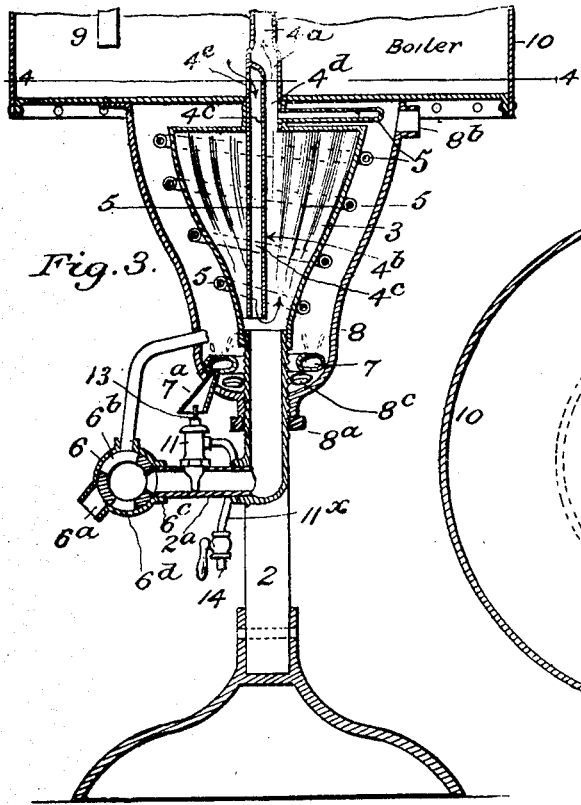
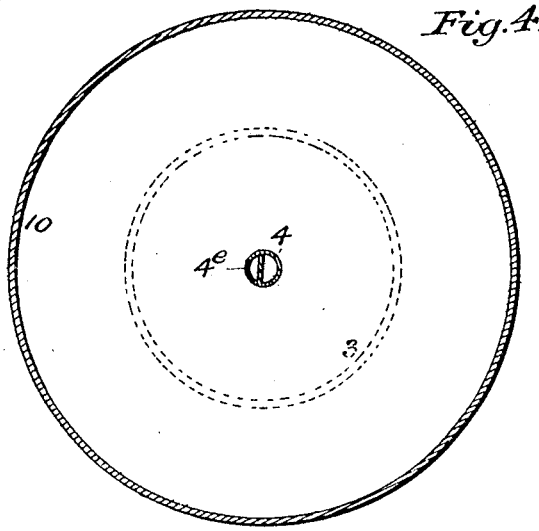
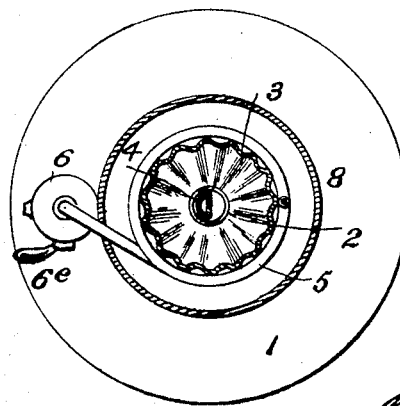
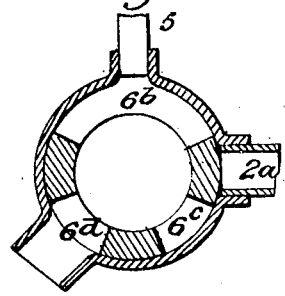
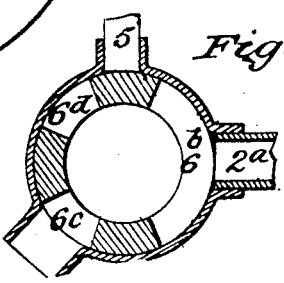

DAVID N. GIBSON, OF HOMESTEAD, PENNSYLVANIA.

WATER-HEATER.

No. 916,297.　　　　Specification of Letters Patent.　　Patented March 23, 1909.

Application filed December 11, 1907. Serial No. 406,084.

*To all whom it may concern:*

Be it known that I, DAVID N. GIBSON, residing at Homestead, in the county of Allegheny and State of Pennsylvania, have invented certain new and useful Improvements in Water-Heaters, of which the following is a specification.

My invention relates to certain new and useful improvements in water heaters of the gaseous fuel type, burning either natural or artificial gas.

Generically, my invention embodies a suitably supported burner which is adapted to coöperate with a heating drum and coil to heat the water, which operating through a circulating system, performs its useful functions. Combined with the burner is a housing which also forms a support for a water reservoir or tank in which the heated water from the coil and drum is primarily discharged and stored up. A suitable valve mechanism coöperates with the water heating drum, coil and tank whereby the water circulation may be controlled and also whereby the collected sediment in the water reservoir, drum and heating coil may be discharged.

In its more specific nature the invention embodies certain novel details of construction, combination and arrangement of parts, all of which will be first described in detail and then be specifically pointed out in the appended claims, reference being had to the accompanying drawings, in which:—

Figure 1, is a perspective view showing my invention. Fig. 2, is a central, vertical, longitudinal section thereof. Fig. 3, is an enlarged central section of a part of my invention. Fig. 4, is a horizontal section on the line 4—4 of Fig. 3. Fig. 5, is a horizontal section on the line 5—5 of Fig. 3. Fig. 6, is an enlarged detail section of the water valve showing the position of the parts when the sediment in the coil is being blown out. Fig. 7, is a similar view showing the position of the parts when the sediment in the drum and the tank is being blown out.

Referring now to the accompanying drawings, in which like letters and numerals of reference indicate like parts in all of the figures, 1 represents a base which supports a standard consisting of a pipe 2 that is threaded, or otherwise secured, to the bottom of a heating drum 3 and is in communication with the interior thereof. The drum 3 is of conical shape in side elevation with its apex end joined to the pipe 2, and is corrugated to offer a large heating surface.

The upper surface of the drum 3 is centrally apertured to receive the enlarged end $4^a$ of a circulatory pipe 4, which projects up into the boiler 10 hereinafter again referred to. The pipe end $4^a$ has an internal longitudinal partition $4^b$ dividing the same into two passage-ways, $4^c$—$4^d$, and this pipe has its section with the passage $4^c$ projecting downwardly into the drum 3 to its apex end while the section having the passage $4^d$ terminates at the top of the drum. The pipe 4 has an aperture $4^e$ in its enlarged portion $4^a$ at the upward limit of the passage $4^c$ to serve as a water inlet to such passage from the boiler or tank. The pipe 4 continues up to near the top of the boiler or tank wherein it discharges.

Surrounding the heating drum 3 is a heating coil 5, one end of which joins with the pipe section $4^a$ and communicates with the passage $4^d$ thereof, while the other end of the coil connects with a two-way valve 6 that is in turn connected with the pipe 2 beneath the drum by a by-pass or lateral $2^a$, for a purpose hereinafter explained.

A ring-like burner 7, preferably of the Bunsen type, surrounds the pipe 2 below the drum 3 to heat the drum and coil, the burner having the usual gas inlet bell or mouth $7^a$, as indicated. A thermostatic gas valve 11, coöperates with the bell $7^a$ to supply the burner with fuel.

8 designates a housing for the burner, the drum, and the coil, the housing being secured on the pipe 2 by a collar and nut $8^a$ for adjustment along the pipe. The housing incloses the burner, the drum and coils, but has its upper end opened and is adapted to form a support for the boiler or reservoir 10 leaving the bottom of the reservoir exposed to the heat of the burner, and thus acting as an auxiliary heating surface. A flue opening $8^b$ and an air inlet $8^c$ may be provided in the housing.

The cold water inlet pipe 9 passes to the bottom of the tank or receptacle 10 through its top, while the hot water off-take pipe $9^a$ connects with the top of the tank, as shown.

The water valve 6 is a two-way one, having an outlet port $6^a$ in its casing and passages $6^b$—$6^c$—$6^d$ in its rotary member, a handle $6^e$ being provided to turn such member.

When the valve is in the position shown in Fig. 6, the full water pressure acts to blow out the sediment in the coil 5, while when the valve is in the position shown in Fig. 7, the pipe 2, drum 3 and tank will be blown out. The normal position of the valve is that shown in Fig. 2.

The pipe section 13 enters the bell 7ª of the burner to discharge the gas therein. Gas is admitted from the source of supply to a connection 11×, as indicated.

The manner in which my invention operates will be best explained as follows: Assume the cold water inlet pipe 9 and the hot water outlet pipe 9ª to be connected to a circulating system, the operator turns on the valve 14 to permit gas to flow through the thermostat to the burner at which point it is ignited. The heat of the burner acting upon the coil, the drum and the bottom of the tank, serves to warm the water therein, causes the cold water to flow into the passage 4ᶜ of the pipe section 4ª, see arrows in Fig. 3, and is discharged into the bottom of the heating drum from which it flows upward of the pipe 4 and is discharged at the top of the tank, a portion of said cold water that is discharged at the bottom of the drum flows through the pipe 2 and by-pass 2ª to the water valve 6 and from thence through the heating coil and is discharged into the pipe 4 at its section 4ª, above the heating drum. The water in the pipe 4 will therefore be hot water and will ascend to the top of said pipe where it is discharged in the tank at the top thereof, as stated. The hot water may be then drawn off from the tank and cold water admitted through the cold water pipe 9 which discharges near the bottom of the tank for a purpose well understood. The heat of the burner acts not alone upon the heating drum and coil but as well upon the bottom of the reservoir or tank thus causing the water at that place to become partially heated and ascend to the top of the tank.

While I have made a brief reference to a thermostatic device in the drawings and specifications of this application, I make no claim thereto in this application as the same per se, forms the subject-matter of another application.

From the foregoing description taken in connection with the accompanying drawings, it is thought the complete construction, operation and many advantages of my invention will be readily understood by those skilled in the art to which the invention appertains.

What I claim is:—

1. A heater comprising a heating drum, a pipe connected with the top of said heating drum and having a plurality of passages, said pipe projecting into the heating drum, one of said passages terminating adjacent to the bottom of said heating drum and the other passage terminating at the top of the heating drum, combined with a heater for said drum and means for admitting water into one of said pipe passages, said water adapted to flow out of the other passage of the pipe when hot, and an auxiliary heating coil surrounding said drum and coöperatively connected with said pipe and said drum.

2. A heater comprising a heating drum, a pipe connected with the top of said heating drum and having a plurality of passages, said pipe projecting into the heating drum, one of said passages terminating adjacent to the bottom of said heating drum and the other passage terminating at the top of the heating drum, combined with a heater for said drum and means for admitting water into one of said pipe passages, said water adapted to flow out through the other passage of the pipe when hot, an auxiliary heating coil surrounding said drum and coöperatively connected with said pipe and said drum, and a valve connected with said heating coil and said drum.

3. A heater comprising a heating drum, a pipe connected with the top of said heating drum and having a plurality of passages, said pipe projecting into the heating drum, one of said passages terminating adjacent to the bottom of said heating drum and the other passage terminating at the top of the heating drum, combined with a heater for said drum and means for admitting water into one of said pipe passages, said water adapted to flow out through the other passage of the pipe when hot, an auxiliary heating coil surrounding said drum and coöperatively connected with said pipe and said drum, and a reservoir supported over said drum and burner said pipe projecting into said reservoir to discharge therein.

4. A heater comprising a pipe, a heating drum connected with said pipe at the bottom of the drum, another pipe connected with said heating drum at the top thereof, said pipe having a plurality of passage-ways, one of which terminates at the top of the drum and the other near the bottom of the drum, a heating coil surrounding said drum and connected at one end to the second pipe above the drum, to communicate with one of the passage-ways thereof, said heating coil connected with the first mentioned pipe at the bottom of the heating drum, and means for admitting water into one of the passage-ways of the second pipe.

5. A heater comprising a pipe, a heating drum connected with said pipe at the bottom of the drum, another pipe connected with said heating drum at the top thereof, said pipe having a plurality of passage-ways, one of which terminates at the top of the drum and the other near the bottom of the drum, a heating coil surrounding said drum and connected at one end to the second pipe above the drum, to communicate with one of the passage-ways thereof, said heating coil connected with the first mentioned pipe at the bottom of the heating drum, means for admitting water into one of the passage-ways of the second pipe, a reservoir supported over said drum and in communication with said means for admitting water, said second pipe projecting toward the top of said reservoir to discharge into the same, means for conveying cold water to said reservoir, means for taking off heated water from said reservoir and a burner for heating said drum and coil.

6. As a new article of manufacture, a heater, comprising a base, a pipe support carried thereby, a heating drum connected with the upper end of said pipe support at the bottom of the heating drum, a bi-lateral connected with said pipe support, a valve connected with said bi-lateral, a heating coil connected with said valve and surrounding said heating drum, a circulating pipe connected with said heating drum at the top thereof, said circulating pipe having a pair of separate passages, means for admitting water into one of said passages, said pipe having one of its passages discharging near the bottom of said heating drum and the other passage terminating at the top of said heating drum, said heating coil having its other end connected with said circulating pipe and in communication with one passage thereof, said circulating pipe adapted to be connected with a water reservoir.

7. As a new article of manufacture, a heater, comprising a base, a pipe support carried thereby, a heating drum connected with the upper end of said pipe support at the bottom of the heating drum, a bi-lateral connected with said pipe support, a valve connected with said bi-lateral, a heating coil connected with said valve and surrounding said heating drum, a circulating pipe connected with said heating drum at the top thereof, said circulating pipe having a pair of separate passages, means for admitting water into one of said passages, said pipe having one of its passages discharging near the bottom of said heating drum and the other passage terminating at the top of said heating drum, said heating coil having its other end connected with said circulating pipe and in communication with one passage thereof, said circulating pipe adapted to be connected with a water reservoir, and a housing for said burner, heating coil and drum.

8. As a new article of manufacture, a heater, comprising a base, a pipe support carried thereby, a heating drum connected with the upper end of said pipe support at the bottom of the heating drum, a bi-lateral connected with said pipe support, a valve connected with said bi-lateral, a heating coil connected with said valve and surrounding said heating drum, a circulating pipe connected with said heating drum at the top thereof, said circulating pipe having a pair of separate passages, means for admitting water into one of said passages, said pipe having one of its passages discharging near the bottom of said heating drum and the other passage terminating at the top of said heating drum, said heating coil having its other end connected with said circulating pipe and in communication with one passage thereof, said circulating pipe adapted to be connected with a water reservoir, and a housing for said burner, heating coil and drum, said housing being secured to said standard and adapted to support a water reservoir over the heating drum.

9. In a heater of the character described, a reservoir, a circulating pipe within said reservoir having one end arranged to discharge into the reservoir and the other end projecting through said reservoir to the outside thereof, said projecting end having a supplemental pipe portion in communication with the interior of the reservoir and having an open or outer end, means for circulating water through said pipe and said reservoir, said means including an exterior connection between said circulating pipe and the outer or open end of the supplemental pipe section.

DAVID N. GIBSON.

Witnesses:
T. J. TYRRELL,
E. J. BALZER.